(12) United States Patent
Lindgren et al.

(10) Patent No.: US 7,349,432 B2
(45) Date of Patent: Mar. 25, 2008

(54) METHODS FOR CHANGING THE BANDWIDTH OF A CIRCUIT SWITCHED CHANNEL

(75) Inventors: Per Lindgren, Stockholm (SE); Christer Bohm, Nacka (SE); Magnus Danielson, Stocksund (SE); Anders Bostrom, Solna (SE)

(73) Assignee: Net Insight AB, Stockholm (SE)

( * ) Notice: Subject to any disclaimer, the term of this patent is extended or adjusted under 35 U.S.C. 154(b) by 351 days.

(21) Appl. No.: 11/227,242

(22) Filed: Sep. 16, 2005

(65) Prior Publication Data
US 2006/0056453 A1   Mar. 16, 2006

Related U.S. Application Data

(63) Continuation-in-part of application No. 09/786,889, filed as application No. PCT/SE99/01573 on Sep. 9, 1999, now Pat. No. 6,990,120.

(30) Foreign Application Priority Data
Sep. 10, 1998   (SE)   .................................... 9803068

(51) Int. Cl.
*H04J 3/22*   (2006.01)
(52) U.S. Cl. ........................ 370/468; 709/229; 709/230
(58) Field of Classification Search ................ 370/321, 370/280, 294, 334, 347, 442, 472, 250, 458, 370/488
See application file for complete search history.

(56) References Cited

U.S. PATENT DOCUMENTS

| | | |
|---|---|---|
| 4,980,886 A | 12/1990 | Bernstein |
| 5,157,657 A | 10/1992 | Potter et al. |
| 5,229,992 A | 7/1993 | Jurkevich et al. |
| 5,517,499 A | 5/1996 | Gauffin et al. |
| 5,838,687 A | 11/1998 | Ramfelt |
| 6,157,656 A | 12/2000 | Lindgren et al. |
| 6,377,640 B2 * | 4/2002 | Trans ......................... 375/354 |
| 6,430,180 B1 | 8/2002 | Bohm et al. |
| 6,587,472 B1 | 7/2003 | Antal et al. |
| 2002/0126687 A1 | 9/2002 | Lindgren et al. |
| 2002/0126688 A1 | 9/2002 | Lindgren et al. |

FOREIGN PATENT DOCUMENTS

| | | |
|---|---|---|
| WO | WO 97/24846 | 7/1997 |
| WO | WO 97/36403 | 10/1997 |

\* cited by examiner

*Primary Examiner*—Rafael Perez-Gutierrez
*Assistant Examiner*—Nimesh Patel
(74) *Attorney, Agent, or Firm*—Finnegan, Henderson, Farabow, Garrett, & Dunner, L.L.P.

(57) ABSTRACT

The present invention relates to methods for changing the bandwidth of a circuit switched channel in a time division multiplexed network, wherein said channel comprises a set of time slots within each recurring frame of a bitstream between a first node and a second node. According to the invention one or more additional time slots within each recurring frame of said bitstream are reserved, including using, during a period of time, only said set of time slots for transmitting payload data pertaining to said channel while providing, during said period of time, information indicating that said one or more additional time slots are currently not used for transferring payload data. After said period of time, said set of time slots is used as well as said one or more additional time slots on said bitstream for transmitting payload data pertaining to said channel.

7 Claims, 8 Drawing Sheets

METHODS FOR CHANGING THE BANDWIDTH OF A CIRCUIT SWITCHED CHANNEL

This application is a continuation-in-part of prior application Ser. No. 09/786,889, filed Jun. 15, 2001, now U.S. Pat. No. 6,990,120 which is a U.S. national phase application under 35 U.S.C. § 371 of International Application No. PCT/SE99/01573, filed on Sep. 9, 1999, which claims benefit of priority to Swedish Application No. 9803068-7, filed on Sep. 10, 1998.

TECHNICAL FIELD

The present invention relates to methods changing the bandwidth of a circuit switched channel in a time division multiplexed network, said channel comprising a set of time slots within each recurring frame of a bitstream of said network.

BACKGROUND

In recent years, the need for network solutions providing quality of service in high bandwidth applications has evolved as a result of the increasing demand for transfer of, e.g., real-time speech, video and multimedia over networks such as the Internet.

The use of circuit switched networks, which have the inherent property of providing each host with a guaranteed bandwidth, has been found to provide many advantageous features in this context.

A new circuit switched network solution, which has received much interest over the last few years, is known as DTM (Dynamic synchronous Transfer Mode). In a DTM network, circuit switched isochronous channels may be dynamically established, modified, and terminated based upon changes in user capacity requirements.

An advantage with DTM is that the bandwidth of an established isochronous channel may be dynamically changed by the allocation or deallocation of time slots to said channel. However, changing the bandwidth of an existing channel requires synchronization between sender and receiver(s), as well as intermediate nodes, to avoid losing data (in case the sender increases the number of slots allocated to a channel before the receiver does), or to avoid receiving garbage data (if the receiver increases the number of slots allocated to said channel before the sender does).

Different suggestions have been made of how to arrange the necessary bandwidth change synchronization to avoid these problems. One suggested solution has been to simply stop sending data while the bandwidth change is being performed. However, this means that the channel is unused during a period of time, thus inevitably leading to a waste of bandwidth resources. Another suggested solution has been to ensure that the bandwidth change is being made simultaneously at sender, receiver, and any intermediate nodes, by numbering the network frames and, using control signaling for agreeing on which specific frame to effectuate the change. This of course has the drawback of requiring extra signaling and the provision of an often complicated frame counting mechanism.

In view of the above, it is desirable to provide a simple, reliable, safe and effective mechanism for synchronizing bandwidth changes in a circuit switched networks of the kind mentioned in the introduction, especially in a DTM network.

SUMMARY

Hence, according to one aspect of the invention, there is provided a method of the kind mentioned in the introduction, said method being used when increasing the bandwidth of a channel and being characterized by: reserving, for said channel, one or more additional time slots within each recurring frame of said bitstream, including using, during a period of time, only said set of time slots for transmitting payload data pertaining to said channel while providing, during said period of time, information indicating that said one or more additional time slots are currently not used for transferring payload data; and using, after said period of time, said set of time slots as well as said one or more additional time slots on said bitstream for transmitting payload data pertaining to said channel.

According to another aspect of the invention, there is provided a method of the kind mentioned in the introduction, said method being used when decreasing the bandwidth of a channel and being characterized by: using, during a period of time, only a portion of said set of time slots for transmitting payload data pertaining to said channel while providing, during said period of time, information indicating that the remaining time slots of said set of time slots are currently not used for transferring payload data; and deallocating, after said period of time, said remaining time slots from said channel while continuing using said portion of said set of time slots for transmitting payload data pertaining to said channel.

The invention is thus based upon the idea of not using, during the bandwidth change, those time slots that are to be allocated/deallocated to/from a channel (or at least a number of time slots (within the channel) corresponding to the number of time slots that are to be allocated/deallocated to/from the channel), and to provide the bitstream with information designating them as providing invalid data, i.e. as not payload data, typically by marking these time slots as being idle, while at the same time using those time slots that are to be unchanged (i.e. slot already belonging to the channel in the case of a bandwidth increase, or slots that are not to be deallocated from the channel in the case of a bandwidth decrease) for transferring payload data.

For example, if a sending node wants to allocate additional resources to a channel, it may at any time reserve additional time slots on the bitstream that it is connected to, as long as it marks the additional time slots as being idle and only transmits payload data in the time slots that already belonged to the channel prior to said allocation. When the sending node later receives information indicating that downstream nodes have allocated the desired extra bandwidth to the channel and/or are "listening" to the additional time slots, the sending node may at any time discontinue transmitting said information designating said additional time slot as being idle and instead start transmitting payload data using said additional time slots as well.

Consequently, said period of time will preferably end with, or shortly after, the reception at the sending node of information indicating that concerned downstream nodes switching or receiving said channel have allocated the desired extra bandwidth to the channel and are listening thereto and/or are ready to switch data received therein. However, according to an alternative embodiment, said period of time will be fixed period of time. In such a case, the sending node, after having sent a request for additional capacity to concerned downstream nodes, and after having waited said fixed period of time, will assume that any intermediate nodes switching said channel, and the receiving node listening to said channel, will have had enough time to allocate the necessary resources and to provide the necessary mapping. The sending node will thus simply assume that the extra resources are "up and running" and consequently start transmitting payload data in said additional time slots. This, of course, may in some cases result in loss of data, but will on the other hand provide a simpler mechanism requiring less signaling.

Similarly, having received instructions to allocate additional resources to an existing channel, an intermediate node switching said channel may for example at any time allocate additional time slots to said channel on the outgoing bitstream that the channel is switched to as long as the intermediate node provides the outgoing bitstream with information indicating those time slots of the outgoing bitstream that are so far not transferring payload data. When having received instructions as to which time slots that constitute said additional resources slots on said incoming bitstream, and having made sure that concerned downstream nodes have acknowledged the bandwidth increase, the intermediate node will provide the necessary mapping of data with respect to the added time slots and will discontinue transmitting said information indicating that said additional time slots are so far not transferring payload data.

In other words, the acknowledgement that the additional bandwidth is accepted is preferably performed backwards, starting from the receiving node. When having made the necessary arrangements for listening to the new bandwidth, it will notify the upstream next hop intermediate node handling the channel that it is ready to receive payload data in the new slots. The last intermediate node will then, having made its necessary arrangements for switching the added slots, notify its upstream next hop intermediate node similarly, and so on. When, finally, the intermediate node located closest to the sending node notifies the sending node that the added bandwidth is accepted all the way, the sending node may, at any time, start using the additional time slots for transmitting payload data.

The invention is also advantageous in the context of multi- or broadcasted channels having several receivers. According to one embodiment of the invention, if wanting to make sure that there is no data loss or the like at any one of the receivers of the channel, before discontinuing sending idle markings in the added time slots, each intermediate node shall make sure to receive information indicating that all downstream nodes receiving or switching said channel have acknowledged the bandwidth change before the intermediate node may go ahead and send an acknowledgement of (and start mapping from/to) the added time slots to the sender or the upstream next hop intermediate node. Thus, when the sender has received one or more acknowledgements indicating that all nodes receiving or switching said channel are "listening" to the added time slot, it may at any time start sending payload data thereon.

An advantage of the invention is thus that the need for stringent bandwidth change synchronization between nodes involved in the management of a channel is relaxed. Using the invention, the sending, receiving, and intermediate nodes may, separately and with comparatively relaxed synchronization requirements, allocate additional time slots and start using additional time slots, as long as said additional time slots are for the time being marked as being idle, i.e. not providing payload data. When control signaling between nodes then indicate that the channel from sender to receiver is "up and running", the sending node may at any time, without any need for notifying downstream nodes, simply switch from marking said additional time slots as idle to transmitting payload data into said additional time slots.

Similarly, when decreasing the size of a channel, the sending node may, for example, simply stop transmitting payload data in one or more time slots to be deallocated from the channel, and instead start marking said one or more time slots as being idle, thereby making sure that downstream nodes will not consider data provided in said one or more time slots as valid payload data, while continuing transmitting payload data in those time slots that are not to be deallocated. The sending node may then, at any time, instruct downstream nodes, such as the receiving node or an intermediate node, to deallocate resources corresponding to said one or more time slots from said channel. Each intermediate node, when having received confirmation from downstream nodes that they are aware that the subject resources are no longer to be part of the channel, may then, at any time, completely deallocate said one or more time slots from the channel without any further need for synchronizing the deallocation with other nodes, also informing upstream nodes that it is no longer listening to the deallocated time slots.

According to a preferred embodiment of the invention, the herein discussed bandwidth change instructions and/or bandwidth change acknowledgements are preferably transmitted between nodes using control channels that are established to comprise on or more time slots on the bitstreams of the network but are separated from the payload carrying channels, thereby not interfering with the ongoing traffic.

A very advantageous aspect of the invention is thus that the decisions at different nodes as to when to allocate and start using additional time slots, or when to stop using and deallocate time slots, may be made more independently than compared to prior art solutions.

Another important advantage of the invention is that payload data are transmitted (at least if so desired) in the unaffected time slots of the channel while the bandwidth change is being executed, thereby efficiently limiting the degree of temporary bandwidth blocking during the change.

According to a preferred embodiment of the invention, said information indicating that a time slot is not used for transferring payload data is provided by the step of marking said time slot as being idle, typically by sending an idle time slot pattern, for example, using an idle code word if using 8B/10B encoding, into said time slot or by setting a one-bit flag of the time slot to indicate that the time slot is invalid, i.e. is not transferring payload data. In such cases, the information stating that a time slot does not transfer payload data is advantageously provided within the time slot itself.

However, the manner in which one or more time slots are marked as not providing payload data may be selected in many other ways. For example, the information indicating that a time slot is not providing payload data need not be provided within the time slot as such, but may be derived from another location or part of the associated bitstream, i.e. using some kind of out of band signaling.

In this context, it is to be noted that the actual writing of a code word, setting of a flag, or out of band signaling may just as well be provided by a link head end node marking by default essentially all slots on the bitstream as idle, thus leaving it up to downstream nodes, such as the transmitting node, to "unmark" those slots that will transfer payload data.

Of course, the degree of dynamics by which the features of the invention may be utilized at the nodes handling a channel will depend upon in which degree the nodes handling the channel are equipped with capability to detect, interpret, and generate said information indicating that a time slot is not providing payload data. However, even if only the receiving node is capable of detecting and discarding idle time slots and only the sending node, and preferrably also intermediate switch nodes, are capable of generating idle data, i.e. of designating time slots not providing payload data as being non-valid, the invention will still come to advantageous use.

Furthermore, if said information designating that a time slot is not providing payload data is provided by the writing of an idle block or code word into said time slot, this information is easily propagated to a next hop bitstream by the simple mapping of the idle block from said time slot to a time slot of the channel on the next hop bitstream. Consequently, no extra processing in addition to mere time slot mapping is in such a case needed at the intermediate node to detect the presence of an idle time slot and to provide the next hop bitstream with corresponding information.

A problem which may arise when allocating additional time slots to a channel (or deallocating time slots from said channel) and when said channel extends over more than one bitstream, is that whereas one node may want to allocate, for example, an additional time slot occupying a time slot position after the last one of the time slots already allocated to the channel on the respective bitstream, another node may want to allocate a time slot position in the middle of the time slots already allocated to the channel, on the respective bitstream, thus potentially causing re-ordering of data. (Generally, this problematic situation will not occur at nodes that use channel based mapping, since such a node will typically make sure that the sequential order data received within a channel is preserved.)

One way to avoid this problem would be to only allow intermediate nodes to allocate new slots to a channel in the same time slot order as the sending node. However, this would drastically decrease the possibility to set up the channel and thus result in unnecessary blocking.

Another way of solving this problem is to re-configure (referred to herein as "re-mapping") the mapping instructions at each concerned intermediate node so as to ensure that the order of time slot data is preserved even if the position of the "new" time slot with respect to the other time slots allocated to the channel is different on different bitstreams. Such a re-mapping need then to take place before upstream nodes starts to sending or forwarding payload data instead of idle data blocks in said additional time slots.

According to a preferred embodiment of the invention, in order to make sure that said re-mapping doesn't result in that payload data is re-mapped to a slot not yet recognized by a downstream receiving node as belonging to the channel, any re-mapping to be performed among the time slots forming the channel at an intermediate node, as a result of the change of the amount of resources allocated to said channel, is carried out after the acknowledgement of the bandwidth change from downstream intermediate nodes located closer to a receiver of the channel (which nodes as such may also have had to perform re-mapping among the time slots forming the channel at their respective locations), and preferrably also before use of the added slots is acknowledge to upstream node being the sender of or switching said channel. In other words, any necessary mapping or re-mapping is preferably performed backwards along with the bandwidth change acknowledgement discussed above, starting from the intermediate node located closest to the receiving node. Preferably, when having received acknowledgement that the receiving node is aware that the additional slots now belongs to the channel, the last intermediate node will perform it's mapping (or re-mapping), and will then notify the upstream next hop intermediate node that the new time slots are in use up to that location, said up-stream next hop intermediate node thereby being allowed to perform its own re-mapping, if so desired, and so on. When, finally, the intermediate node located closest to the sending node notifies the sending node that mapping has been established up to that location, the sending node may, at any time, start using the additional time slots for transmitting payload data.

As is understood by those skilled in the art, the way in which the invention is realized, for example with respect to re-mapping issues, will partly, but not necessarily, depend on whether or not channel or slot based mapping is used at the nodes switching said channel.

Even though applicable in many different types of circuit switched time division multiplexed networks using isochronous channels, the most preferred use of the invention is in a so called Dynamic synchronous Transfer Mode (DTM) network, wherein the possibility to dynamically change bandwidth is a very advantageous feature.

For definition, when used herein, the term "isochronous channel" refers to a channel carried on a bitstream wherein the frames of the bitstream occur at a regular pace and wherein the set of time slots defining the channel on that bitstream occupies the same time slot positions within each frame on that bitstream.

For further description of ways of to incorporate and detect as such the presence of information designating time slots as not providing payload data may for example be found in the co-pending patent application SE 9703449-0. For specific details on a preferred way of implement idle markings in for example a DTM network, reference may be made to currently ongoing DTM standardization procedure within the European Telecommunications Standards Institute, ETSI.

The invention allows alternative strategies when increasing the bandwidth of a multicast channel. One embodiment could be that not all of the downstream nodes need to have acknowledged the increase of bandwidth before the change is made effective by the sending node starting to send valid data in the new slots instead of identifying them as being idle. If one or more specific downstream nodes receiving of forwarding a multicast channel has not acknowledged the increase within some specified time-out or have denied the change in a negative acknowledge, for example due to a shortage of capacity in some branch of the multicast channel, the alternative strategy may be to, at least temporarily, close the subject branch of the multicast channel and allow for the increase to become effective on those parts of the multicast tree where the change has been positively acknowledged. For the closed part of the multicast tree, the nodes may then possibly request some form of re-establishment to again allow the channel to reach the affected downstream nodes, for example through a potentially different path through the network or at a later time when sufficient capacity has become available. The benefit of this strategy is that a local capacity problem or loss of communication with one or more specific downstream nodes will not prohibit the increase of bandwidth on said channel for other parts of the multicast tree.

Another aspect of the invention is in the context of so-called protected cannels within the Network. For the purpose of this document, a protected channel is when a channel (the "protected channel") is split (at the so-called "split point") to comprise two or more separate (parallel) channel segment (the "redundant channels") which are established to carry the same data in parallel, preferably over separate link and node paths over at least some subnet of the network, to later again be joined (at the so-called "joint point") into a single signal or channel so that any of the redundant channels of said protected channel can be chosen to provide the a single bitstream, from which the nodes (if any) downstream of the joint point nodes will receive their data.

At the split point, the data transported in the protected channel is thus copied into two or more copies, one for each of the redundant channels. At the joint point, a decision is made as to which of the redundant channels to currently receive (and possible forward) the data from. In the failure of any such redundant channel, a local decision can be made at the joint point to shift to the non-failing redundant channel, which will then become the new "current" redundant channel from which data is currently received.

A protected channel thus locally comprises two or more channels as redundant channels in the entire or some subnet of the network. At the split point, the bitstream of the protected channel is transmitted into two or more redundant channels having the same bandwidth as the first mentioned channel. At the join point, the bitstream of such two or more redundant channels of same bandwidth can be used as alternate source to for a single output signal, which may be extracted from the network at the joint point, or may be forwarded further downstream as a single continuing outgoing channel having the same bandwidth as each of the redundant channels. A protected channel may use any combinations of said split points and join points to interconnect redundant channels to result in a redundant channel setup. The redundant channels from one split point can be rejoined at the same join point in a downstream node. Alternatively, join points may receive their input redundant channels from different split points or other join points as suitable to the users redundancy needs.

An aspect of the invention is the use of the mechanism for change of bandwidth as suggested by the invention in the context of such protected channels.

According to one embodiment thereof, when increasing the bandwidth of a protected channel, the split point node will allocate added slots to each of the redundant channels and temporarily mark said added slots as being idle. When the bandwidth increase is achievable for all the redundant channels, the split point will make the added slots effective by ceasing to identify the added slots as being idle and instead start sending payload data in such slots. This embodiment ensures that the bandwidth of the protected channel is never merely increased for a subset of the redundant channels, thereby implying a limitation of the level of redundancy.

For example, a joint point could refrain from sending any bandwidth increase acknowledgements for any of the redundant channels until it has determined that slots have been added for all the redundant channels (typically by having received channel bandwidth increase requests for all of the redundant channels and started receiving the added slots accordingly). Since the joint point will in this case make sure that "all channels are ok" before sending any acknowledgement, the split point node may start sending payload data in the added slots of all the redundant channels as soon as it receives any acknowledgement (originating) from the joint node.

Alternatively, the joint point may send bandwidth increase acknowledgements and start listening to added slots for any of the individual redundant channels one at a time, but the split point will then await all the expected acknowledgements for all the redundant channels before making the added slots effective for all redundant channels simultaneously by ceasing to identify the added slots as being idle and instead start sending payload data in such slots.

According to another embodiment, which could be used if the change of bandwidth as such has higher priority than the importance of maintaining redundancy, the increase of bandwidth need only be available for one or a portion of the redundant channels before the change is made effective (by the split point node stop marking the added/deleted slots as idle and start/stop transmitting payload data in these specific redundant channels). During the period under which the bandwidth change is made effective for only the subset of redundant channels, only those are considered as sources of the protected channel bitstream for the joint point (and any downstream nodes). This alternative strategy ensures that the channel can increase bandwidth but with a temporary reduction of redundancy until all redundant channels have changed or suitable re-establishments can be performed. If a bandwidth change request is not issued (or acknowledged) for one of the redundant channels, that redundant channel may in this embodiment for example be temporarily removed and suitable re-establishment strategies may be applied.

Corresponding mechanisms and consideration can of course be implemented when decreasing the bandwidth of a protected channel.

Another important aspect with the network protection scheme is that it may be used on both unicast and multicast channels as an independent method of increasing the redundancy of the channel while maintaining the properties of safely increasing or decreasing the bandwidth of said channel.

Also, even though the invention is described in more detail herein with respect to embodiments wherein signaling takes place between the sending node, the receiving node and possible intermediate nodes switching said channel, embodiments of the invention could just as well be realized using for example signaling to/from one or more "master" nodes that handle all signaling with respect to one or more of the involved channel handling nodes.

The above-mentioned and other aspects, features, and advantages of the invention will be evident from the accompanying claims and from following description of exemplifying embodiments thereof.

BRIEF DESCRIPTION OF THE DRAWINGS

Exemplifying embodiments of the invention will now be described with reference to the accompanying drawings, wherein.

DETAILED DESCRIPTION OF PREFERRED EMBODIMENTS

Figure 1:
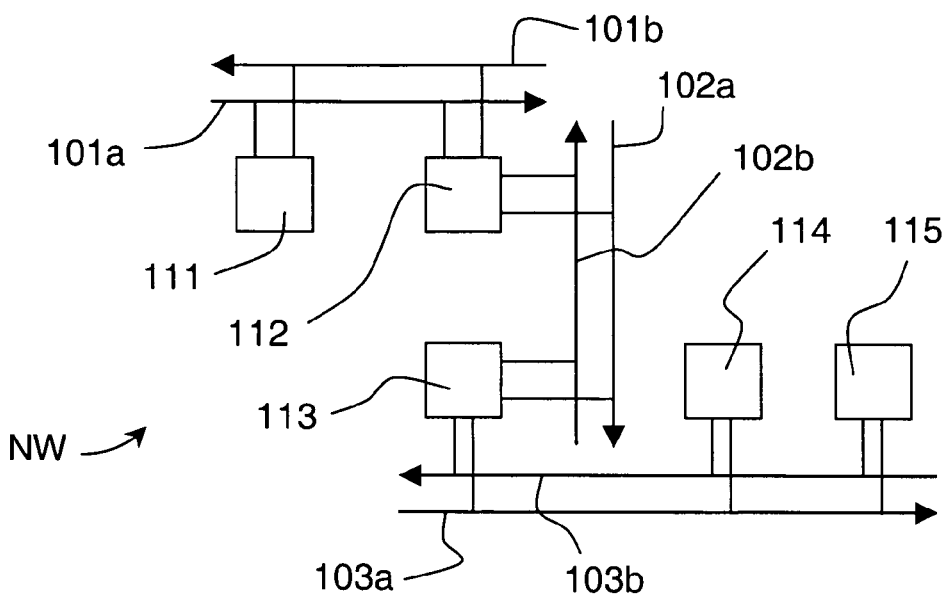
FIG. 1 schematically shows a DTM network.

A time division multiplexed network, in this example being a DTM (Dynamic synchronous Transfer Mode) network, will now be described with reference to FIG. 1. In FIG. 1, five nodes 111-115 are connected via three multi-access bi-directional links, a first one formed by bitstreams 101a and 101b, a second one formed by bitstreams 102a and 102b, and a third one formed by bitstreams 103a and 103b. Nodes 111 and 112 are connected to the first link, nodes 112 and 113 to the second link, and nodes 113-115 to the third link. Consequently, node 112 provides switching between the first and second link and node 113 provides switching between the second and third link.

The data transport structure of the bitstreams in FIG. 1, using bitstream 101a as an example, will now be described with reference to FIGS. 2a-2b.

Figure 2:
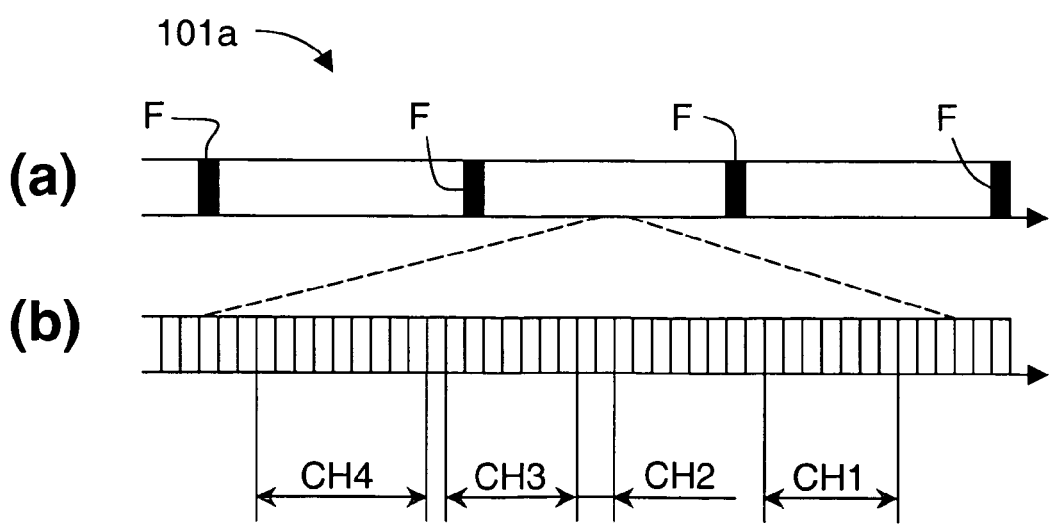
FIG. 2 schematically shows allocation of time slots to channels on a bitstream.

As shown in FIG. 2 at (a), the bitstream 101a is divided into recurrent, essentially fixed sized, e.g. 125 µs, frames. In turn, as illustrated at (b), each frame is divided into a plurality of fixed sized, e.g. 64 bit, time slots. As shown at (a), the start of each frame is defined by a frame synchronization time slot F.

The time slots of a frame are generally divided into control slots and data slots. The control slots are used for signaling between the nodes of the network, whereas the data slots are used for the transfer of payload data. The write access to both control slots and data slots are distributed as desired to the nodes having access to the respective bitstream. The nodes uses the data slots to define channels CH1, CH2, CH3, CH4 on the bitstream. In FIG. 2 at (b), it is for example assumed that channel CH1 has been established from node 111 to node 112. As shown, each channel is allocated a respective set of slots. In the example, the transfer capacity of channel CH1 is larger than the transfer capacity of channel CH2, since the number of time slots allocated to channel CH1 within the frame is larger than the number of time slots allocated to channel CH2. The time slots allocated to a channel occupy the same time slot positions within each recurrent frame of the bitstream. As is understood, a channel may be defined over more that one bitstream, then comprising a set of slots on each of the bitstreams that it is defined over. In such a case, switch nodes will perform the necessary mapping of slots from time slot positions on one bitstream to time slot positions on another.

Exemplifying procedures for changing the bandwidth of a channel according to an embodiment of the invention will now be described with reference to FIGS. 3a-3f, all schematically illustrated a simplified view of the DTM network of FIG. 1.

Figure 3A:
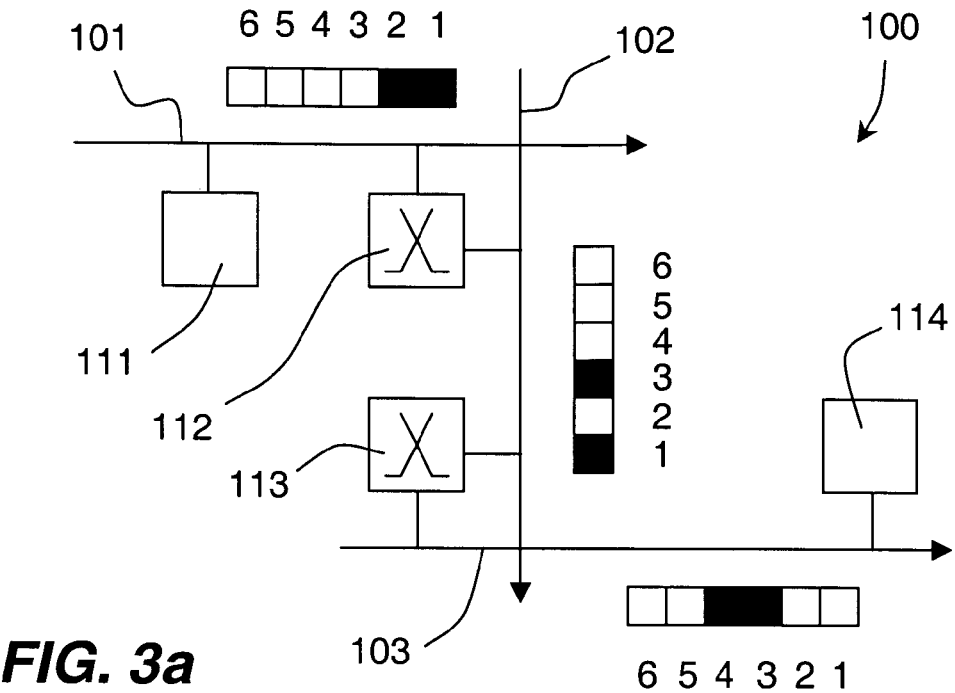
FIGS. 3a-3f schematically illustrates a DTM network and its bitstreams and time slots during a change of channel bandwidth according to an embodiment of the invention.

In FIG. 3a, it is assumed that a circuit switched channel has been established from node 111 to node 114 via nodes 112 and 113. As schematically illustrated in FIG. 3a, the channel is defined to comprise two time slots (marked black in FIG. 3a) within each frame of bitstreams 101, 102, and 103. More specifically, the channel is defined to comprise the first and second time slot within each frame of bitstream 101, the first and third time slot within each frame on bitstream 102, and the third and fourth time slot within each frame on bitstream 103. Consequently, node 112 is arranged to map the content of the first and second time slot on bitstream 101 into the first and third time slot, respectively, on bitstream 102. Likewise, node 113 is arranged to map the content of the first and third time slot on bitstream 102 into the third and fourth time slot, respectively, on bitstream 103.

In this embodiment, node 111 manages allocation of time slots to said channel on bitstream 101, node 112 manages allocation of time slots to said channel on bitstream 102, and node 113 manages allocation of time slots to said channel on bitstream 103.

It is now assumed that, based upon an end user request or for some other reason, node 111 decides to increase the bandwidth of the channel, in this example by one time slot per frame. Preferably using its own pool of free slots, node 111 allocates the desired bandwidth, in this case one slot per frame, to the channel on bitstream 101, in this example the third time slot within each frame.

Figure 3B:
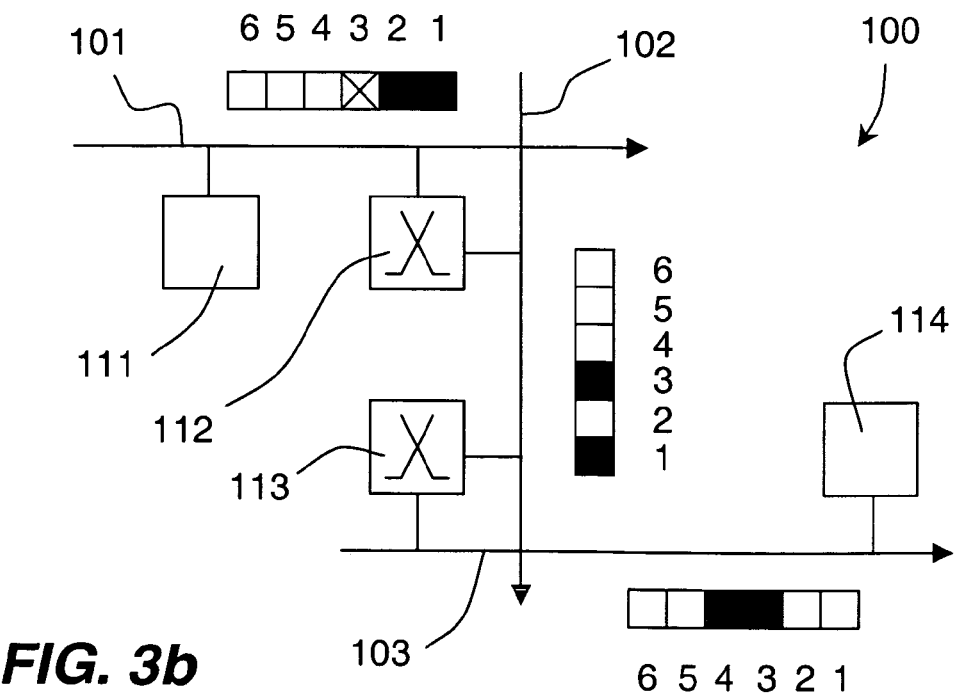
Figure 3C:
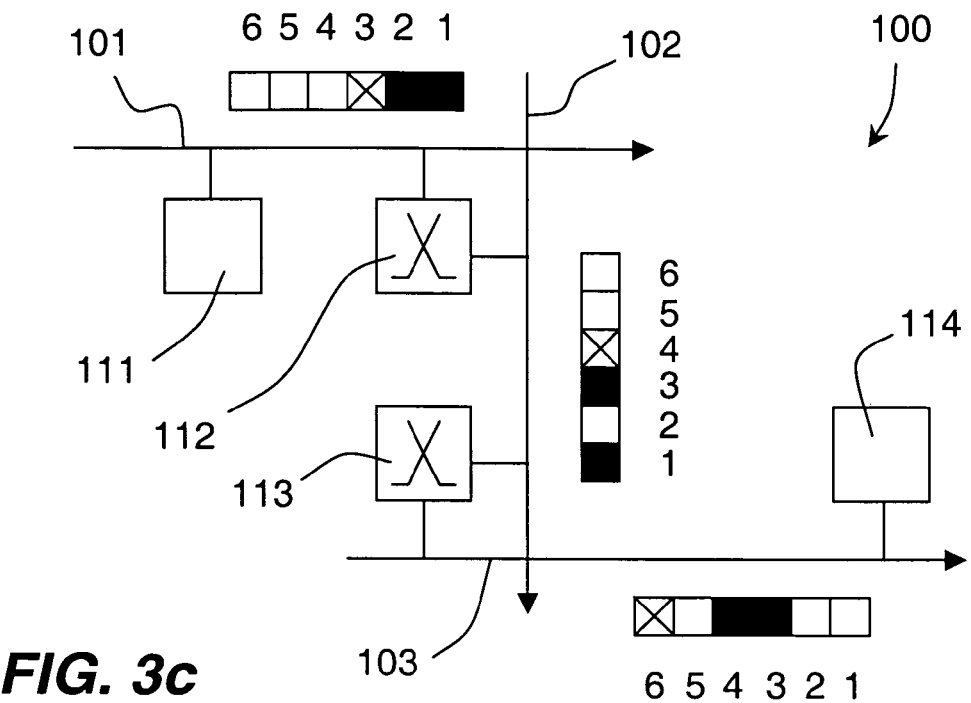

Using control signaling in a channel defined by a control time slot position on bitstream 101, node 111 sends a bandwidth change request to node 112 requesting an increase in the bandwidth allocated to said channel corresponding to one slot per frame and informing node 112 that time slot three on bitstream 101 is now to be part of the channel. At the same time, node 111 continues transmitting payload data in the previously already allocated first and second time slots, and starts transmitting idle markings into the third time slot within each frame of bitstream 101. FIG. 3b illustrates this situation. In FIG. 3b, node 111 has allocated an additional third time slot to said channel on bitstream, and is transmitting payload data into slots one and two and idle markings (as illustrated with an x-marking) into slot three, whereas node 112 and 113 have not yet allocated any additional time slots to said channel on bitstreams 102 and 103.

Since node 112 in the situation shown in FIG. 3b has not yet allocated any additional time slots to the channel on bitstream 102, it has not yet started to map the third time slot from bitstream 101 into bitstream 102.

In a similar manner, preferably using their own pools of free slots, nodes 112 and 113 will correspondingly allocate the desired bandwidth, in this example one slot per frame, to the channel on bitstreams 102 and 103, respectively. It is thus assumed that node 112 allocates the fourth time slot within each frame of bitstream 102 to said channel, and that node 113 allocates the sixth time slot within each frame of bitstream 103 to said channel. Also, node 112 will transmit an announcement message to node 113 informing which time slot (in this case time slot four) on bitstream 102 is now to be part of the channel, and node 113 will transmit an announcement message to node 114 informing that time slot six on bitstream 103 is now to be part of the channel.

Having been informed of the new time slot, the receiving node 114 will start listening thereto and will acknowledge use of the new slot using an acknowledge message sent in a control channel to node 113. As a result, node 113 may stop sending idle into time slot six on bitstream 103 and instead start mapping data from all three slots on bitstreams 102 to all three slots on bitstream 103

Having done so, node 113 will acknowledge use of the added time slot to node 112, whereby node 112 may stop sending idle markings into time slot four on bitstream 103 and instead start mapping data from all three slots on bitstreams 101 to all three slots on bitstream 102. Resulting in the idle-mapping situation illustrated in FIG. 3c.

Figure 3D:
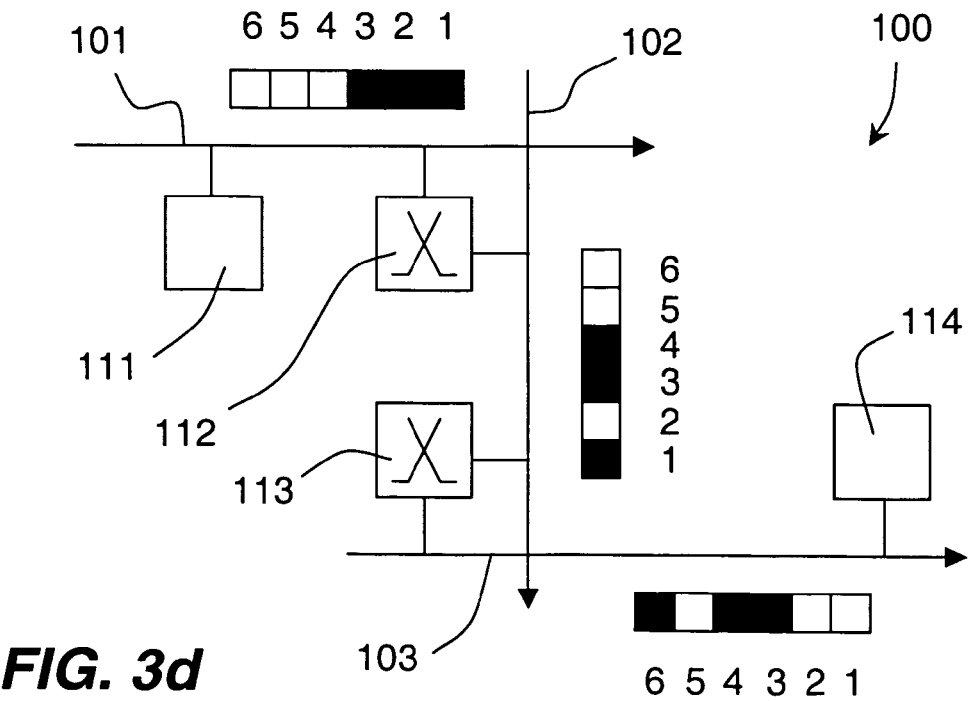

Node 112 will then acknowledge use of the added time slot to node 111, whereby node 111 will determine that it may now go ahead and, at any time, start using the additional time slot for transferring payload data, which will then be mapped by nodes 112 and 113 to reach node 114, as is illustrated in FIG. 3d.

As is understood, if an intermediate node, e.g. node 112 or 113, allocates the requested additional time slot to the channel before the upstream next hop node has had time to allocated a time slot to said channel for said intermediate node to map data from, said intermediate node may still inform a downstream next hop node that said additional time slot is allocated to said channel as long as said intermediate node provides the additional time slot with idle data blocks designating the additional time slot as not providing payload data.

Starting again from FIG. 3a, wherein said circuit switched channel has been established from node 111 to node 114 via nodes 112 and 113, it is now assumed that node 111, based upon an end user request or for some other reason, has decided to decrease the bandwidth of the channel, in this example by one time slot per frame.

Figure 3E:
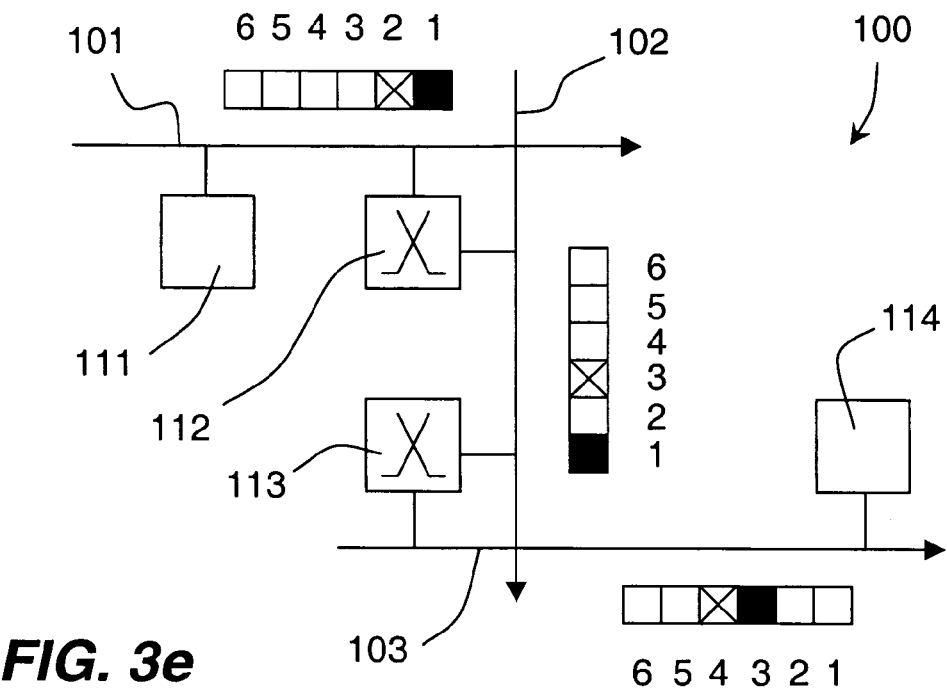

Having decided which time slots to deallocate from said channel, node 111 will start marking the time slot selected to be deallocated as idle, but will continue to transmit payload data into the time slot not selected to be deallocated. In FIG. 3e, node 111 has decided to deallocate the second time slot within each frame on bitstream 101 from said channel and is thus transmitting payload data into slot one and idle markings into slot two (as illustrated with an x-marking), which is then mapped by node 112 and 113 to reach node 114 in time slot four within each frame on bitstream 103. Hence, at this point, the idle marked time slots arriving at node 114 in time slot four of bitstream 103 are consequently discarded.

Using control signaling, node 111 now instructs node 112, and indirectly (via node 112) node 113, to deallocate the time slot corresponding to time slot two on bitstream 101 from said channel on their respective bitstreams, and also indirectly (via node 113) node 114 that time slot four on bitstream 103 is no longer to be considered part of the channel.

Figure 3F:
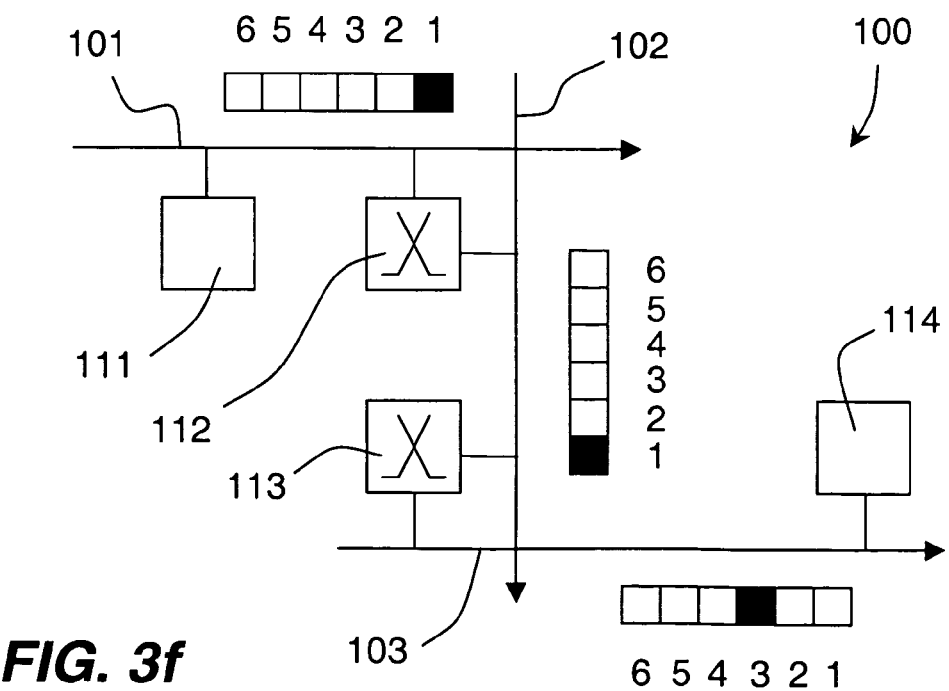

Having received such instructions, and having stopped listening to the so identified time slots, each one of the nodes 112, 113, and 114, will, starting from the receiving node and going down-up in similar to what has been described above, stop using (deallocate) the concerned time slot and send a message acknowledging the bandwidth change confirming that they have performed the requested deallocation. Receiving the final confirmation from node 112, node 111 may at any time deallocate said second time slot on bitstream 101 from said channel, thus leaving only one time slot allocated to said channel, as illustrated in FIG. 3f.

An exemplifying procedure for changing the mapping of time slots when performing a change of bandwidth will now be described with reference to FIGS. 4a-4c.

Figure 4A:
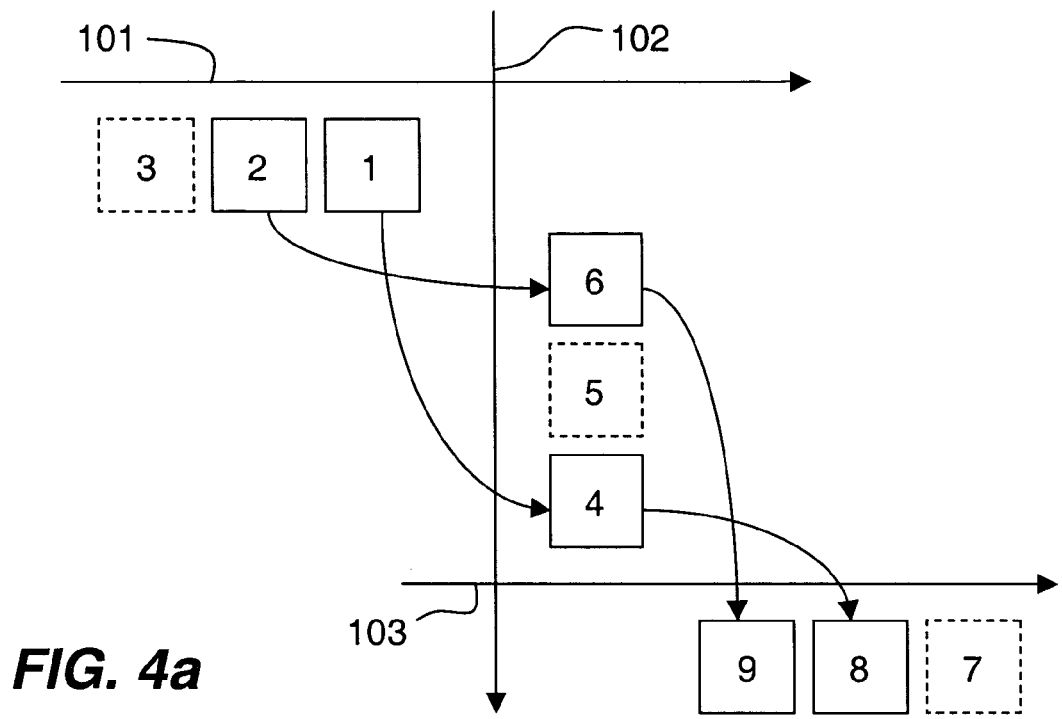
FIGS. 4a-4c schematically illustrates a DTM network during a change of channel bandwidth requiring re-mapping of time slots according to another embodiment of the invention.
Figure 4B:
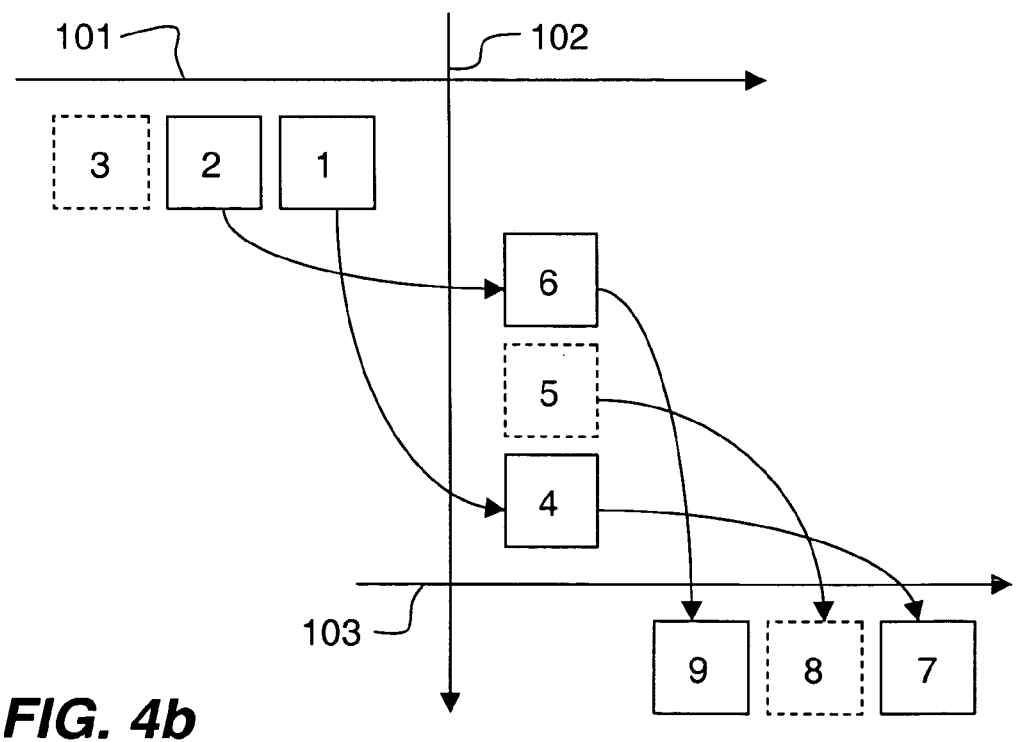
Figure 4C:
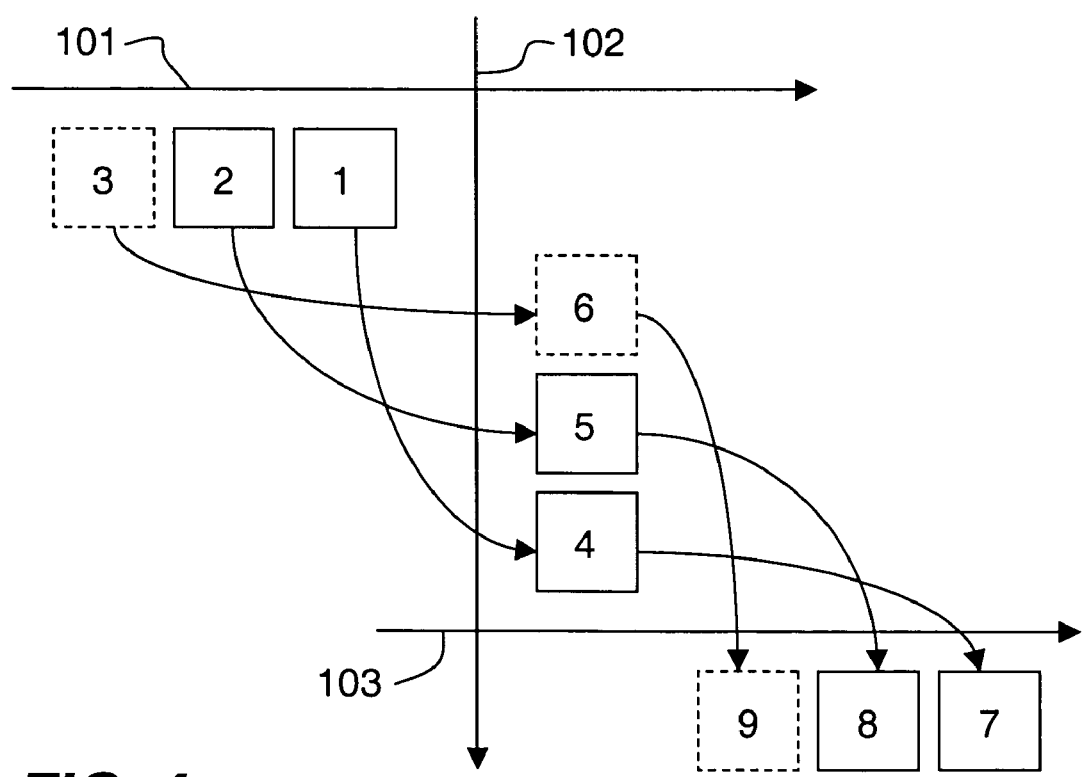

FIGS. 4a-4c schematically show a simplified view of the DTM network of FIG. 1. In FIG. 4a, in similar to FIG. 3a above, it is assumed that a circuit switched channel has been established from a sending node on bitstream 101 to a receiving node on bitstream 103 via two intermediate nodes, wherein the first intermediate node provides time slot mapping between bitstream 101 and bitstream 102 and wherein the second intermediate node provides mapping between bitstream 102 and 103. For simplicity, none of these nodes are showed in FIGS. 4a-4c.

As schematically illustrated in FIG. 4a, the channel is defined to comprise the first and second time slot within each frame of bitstream 101, the fourth and sixth time slot within each frame on bitstream 102, and the eighth and ninth time slot within each frame on bitstream 103 (as indicated by-full line squares in FIG. 4a). Consequently, the first intermediate node is arranged to map the content of the first and second time slot on bitstream 101 into the fourth and sixth time slot, respectively, on bitstream 102. Likewise, the second intermediate node is arranged to map the content of the fourth and sixth time slot on bitstream 102 into the eighth and ninth time slot, respectively, on bitstream 103.

It is now assumed that the sending node decides to increase the bandwidth of the channel, in this example by one time slot per frame. Using control signaling the sending node sends a request to the intermediate nodes requesting an increase in the bandwidth allocated to said channel corresponding to one slot per frame.

In this example, it is assumed that the sending nodes decides to allocate the third time slot within each frame on bitstream 101 to the channel and start sending idle markings therein (as indicated by the broken line square in FIG. 4a). However, it is also assumed that the second intermediate nodes decides to allocate the fifth time slot within each frame on bitstream 102 and that the second intermediate node decides to allocate the seventh time slot within each frame on bitstream 103. Thus, a slot mapping inconsistency problem is present, since the allocated additional time slots occupy the last position within the channel on bitstreams 101 and 103, but the second last position on bitstream 102 and the first position on bitstream 103.

Thus remapping is needed. In this embodiment the remapping is performed starting from the last intermediate node. Hence, before the second intermediate node acknowledges the bandwidth change, and after it has received information from the downstream receiving node that it is listening to the added time slots, the second intermediate node will switch to map data so that the fourth time slot on bitstream 102 is mapped to the seventh, newly allocated time slot on bitstream 103 and the newly allocated fifth time slot on bitstream 102 is mapped to the eighth time slot on bitstream 103, as illustrated in FIG. 4b. Only then will it send the acknowledgement to the first intermediate node.

As a next step, having received the acknowledging message from the second intermediate node informing that the mapping at the second intermediate node is complete, the second last, i.e. the first intermediate node may similarly at any time make its mapping decision and will then select to map data in such a way that the second time slot on bitstream 101 is mapped to the fifth, newly allocated time slot on bitstream 102 and the newly allocated third time slot on bitstream 101 is mapped to the sixth time slot on bitstream 102, see FIG. 4c.

When the first intermediate node then acknowledges to the sending node that allocation of resources and the necessary mapping has been accomplished, the sending node may at any time start using the additional time slots for transmitting payload data, as discussed above.

Figure 5:
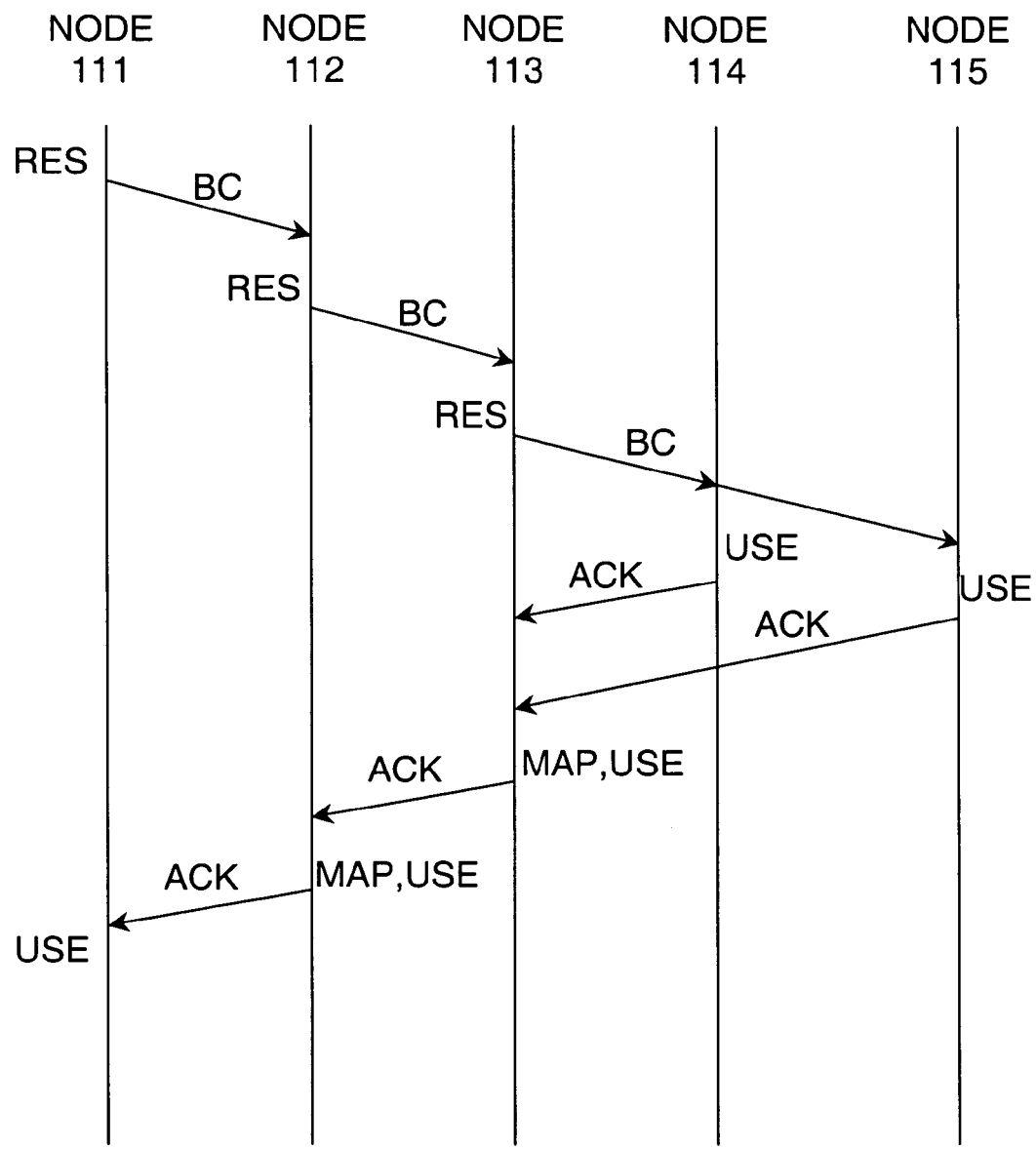
FIG. 5 schematically shows an example of the exchange of messages between nodes during a change of bandwidth according to an embodiment of the invention.

FIG. 5 schematically shows an example of the exchange of messages between the nodes of FIG. 1 during a change of bandwidth according to an embodiment of the invention, much in similar to what has already been described above with reference to FIGS. 3a-3d.

In FIG. 5, to increase the bandwidth of a multicast channel established with node 111 as sender, nodes 114 and 115 as receivers, and nodes 112 and 113 as intermediate switching nodes, node 111 reserves (RES) the required additional slots on its bitstream 101 and, in doing so, starts transmitting idle markings therein (while still transmitting payload data in the channel's original slots). Node 111 then sends a change request message (CH) in a control channel to node 112. Receiving this message, node 112 similarly reserves the required additional slots on its bitstream 102, starts transmitting idle markings therein (while still mapping data from/to the channel's original slots), and sends a similar change request message in a control channel to node 113.

Receiving this message, node 113 similarly reserves the required additional slots on its bitstream 103, starts transmitting idle markings therein (while still mapping data from/to the channel's original slots), and sends a similar change request message in a multicasted control channel to nodes 114 and 115.

When the change bandwidth request message from node 113 reaches the receiving node 114, it starts listening (USE) to the added time slots (as well as the channel's original slots) and sends an acknowledging message (ACK) in a control channel to node 113. Similarity, when the change bandwidth request message from node 113 reaches the receiving node 115, it also starts listening (USE) to the added time slots (as well as the channel's original slots) and sends an acknowledging message (ACK) in a control channel to node 113. Having received acknowledgements from both receiving nodes 114 and 115, node 113 performs any necessary re-mapping to start mapping (MAP, USE) data from the new slots as well as the original slots on bitstream 102 into bitstream 103. It then sends an acknowledging message to node 112, and so on. Finally, when the sending node 111 receives an acknowledging message from node 111, it may at any time start using the new time slots for transmitting payload traffic.

As an alternative embodiment to the previous case, consider that node 113 has sent one or more change message over control channels to node 114 and node 115 and that node 114 has returned an acknowledge message (ACK) but after a certain period of time node 115 has failed to return an acknowledge message (ACK) to node 113, then node 113 may request/decide to remove the part/branch of the multicast channel going to node 115 while retaining the part/branch of the channel going to node 114.

In a similar sense node 113 may choose to disconnect the channel to node 115 if node 115 sends an negative acknowledge message (NACK) in order to indicate that it is unable to accept the change. For both these cases this alternative embodiment provides the additional feature of enabling the multicast channel to not become blocked by individual receivers in its increase of capacity, even if that comes at the expense of certain parts of the network loosing the connectivity to the said channel and its bitstream. It is further included in the preferred embodiment of this invention that additional efforts such as channel re-establishment may be attempted in order to reduce the downtime of said remove part of the channel.

Figure 6:
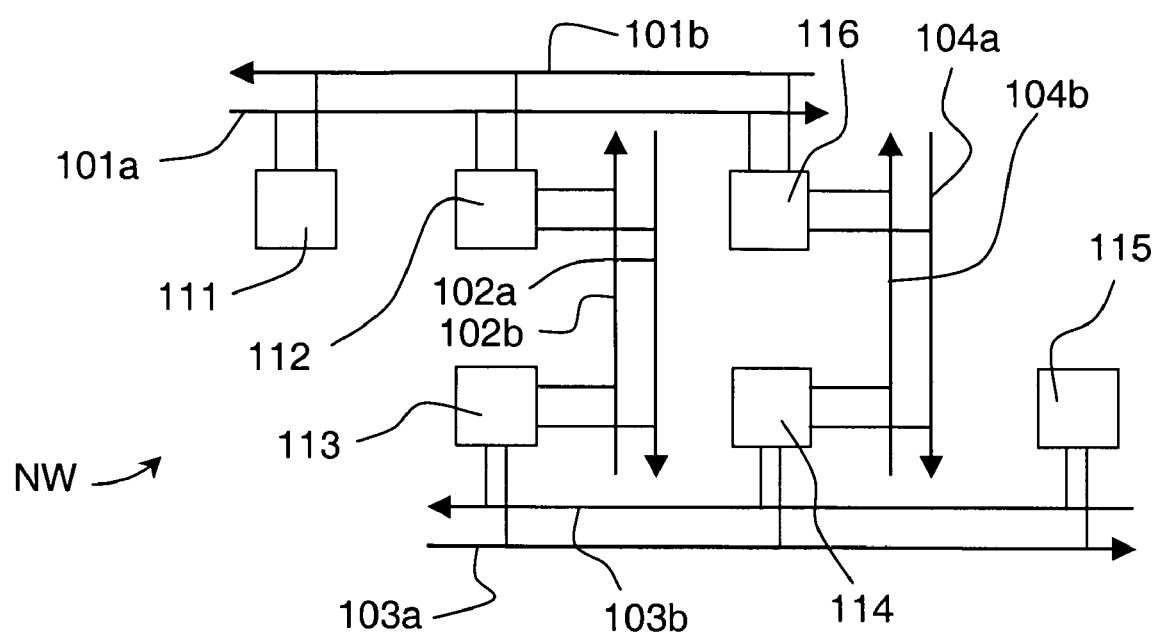
FIG. 6 schematically shows a circuit switched network with redundant paths.

FIG. 6 schematically shows an example network being an extended form of the network of FIG. 1 by the addition of node 116 connected to node 111 via the bidirectional link 101 (comprising the unidirectional bistreams 101a and 101b) and the additional bidirectional link 104 and its unidirectional bitstreams 104a and 104b interconnecting the new node 116 with the existing node 114. In this network, there are two paths over which a channel from node 111 may be connected to node 115. One of these paths is from node 111 to node 112 over bitstream 101a, from node 112 to node 113 over bitstream 102a, and finally from node 113 to node 115 overbitstream 103a. The other path is from node 111 to node 116 over bitstream 101a, from node 116 to node 114 over bitstream 104a, and finally from node 114 to node 115 over bitstream 103a. The redundancy provided by the alternative paths can be used in order to protect a channel against failure of node 113, node 116, the bitstream 101a portion between node 112 and 116, the bitstream 104a, the bitstream 102a and the bitstream 103a portion between node 113 and node 114. This can be achieved by intentionally "splitting" or "multicasting" the channel (in this case referred to as a "protected channel") over the two paths at node 112, such that the bitstream of the said channel as received from node 111 is split/copied/multicast in node 112 towards node 113 and node 116 over bitstream 102a and bitstream 101a respectively using separate channels (called "redundant channels" and logically forming parts of the overall protected channel): a first redundant channel allocated via link 102 and a second redundant channel allocated via link 104. These redundant channels are then brought to the join point in node 114 in which the bitstream of the protected channel is received both from the first redundant channel that passes through node 113 and the second redundant channel that passes through node 116. The join-point in node 114 will monitor the received redundant channels and at any persistent detection of Alarm Indication Signal (AIS) or other channel failure detection mechanism on a redundant channel, that Redundant channel will be disqualified from being the selected path from which the bitstream of the protected channel is to be delivered towards the downstream node(s) (in this case node 115) and the other redundant channel is selected in its place, in case the selected channel was detected to fail. Selection may also be forced through operator action in node 114. This embodiment refers to the change of capacity in said protected channel any similar channels using any other suitable combinations of split and join points for redundant channels, including having multiple receivers as with normal multicast.

In FIG. 6, to increase the bandwidth of a protected channel established with node 111 as a sender, node 112 as a split point switching node, node 113 and node 116 as intermediary switching nodes, node 114 as join point switching node and node 115 as receiver, node 111 reserves (RES) the required additional slots on its bitstream 101a and, in doing so, starts transmitting idle markings in the added slots (while still transmitting payload data in the channel's original slots). Node 111 then sends a change request message (CH) in a control channel to node 112. Receiving this message, node 112 similarly reserves the required additional slots on bitstream 101a (for the second redundant channel going via node 116) and on bitstream 102a (for the first redundant channel going via node 113), starts transmitting idle markings in the added slots (while still mapping data from/to the channel's original slots), and sends a similar change request message in the control channels to node 113 and node 116. Receiving this message, node 113 similarly reserves the required additional slots on it bitstream 103a (for the portion of the first redundant channel from node 113 to node 114), starts transmitting idle markings therein (while still mapping data from/to the channel's original slots), and sends a similar change request message in the control channels to node 114. Node 116 similarly reserves the required additional slots for the second redundant channel on it bitstream 104a, starts transmitting idle markings therein (while still mapping data from/to the channel's original slots), and sends a similar change request message in the control channels to node 114. Receiving these messages from node 113 and node 116, node 114 similarly reserves the required additional slots for the downstream channel on bitstream 103a from node 114 to 115, starts transmitting idle markings therein (while still mapping data from/to the channel's original slots), and sends a similar change request message in the control channels to node 115. When the change of bandwidth request message from node 114 reaches the node 115, it starts listening (USE) to the added slots (as well as the channel's original slots) and sends an acknowledge message (ACK) in a control channel to node 114. Having received the acknowledgement from node 115, node 114 performs any necessary re-mapping to start mapping (MAP, USE) data from the new slots as well as the original slots on bitstreams 103a or 104a (depending on which of the redundant channels into node 114 that is currently the selected "primary" redundant channel). It then sends an acknowledgement message to node 113 and node 116. Having received the acknowledgement from node 114, node 113 performs any necessary re-mapping to start mapping (MAP, USE) data from the new slots as well as the original slots on bitstream 102a into bitstream 103a. It then sends an acknowledgement message to node 112. Having received the acknowledgement from node 114, node 116 similarly performs any necessary re-mapping to start mapping (MAP, USE) data from the new slots as well as the original slots on bitstream 101a into bitstream 104a. It then sends an acknowledgement message to node 112. Having received the acknowledgements from both node 113 and node 116, node 112 performs any necessary re-mapping to start mapping (MAP, USE) data from the new slots as well as the original slots on bitstream 101a into the first redundant channel on bitstream 101a and the second redundant channel on bitstream 102a. It then sends an acknowledgement message to node 111. Finally when the sending node 111 receives an acknowledging message from node 112, it may at any time start using the new time slots for transmitting payload traffic.

According to one embodiment the joint point node 114 must have received the request to increase bandwidth messages for both the redundant channels which node 114 acts as a joint point for, i.e. for both the first redundant channel from node 113 and the second redundant channel from node 116, before it considers the request, or at least before it issues any acknowledgements upstreams. In this embodiment, node 112 may issue its upstream acknowledge message as soon as it has received any of the acknowledge messages from node 113 or node 116. An alternative embodiment would allow node 114 to acknowledge a request upstream even should it not have received request for both the redundant channels, but then node 112 should be arranged to await acknowledgements for both redundant channels (i.e. from both node 113 and node 116) to ensure the full support of both channels.

According to an alternative embodiment, if the bandwidth change as such has higher priority than reducing the risk of a reduction in the level of redundancy, node 112 in the previous example could issue the upstream acknowledgement message as soon as it has received the acknowledgement message from either node 113 or node 116. Under these conditions, one of the first redundant channel over node 113 or the second redundant channel over node 116 may not be fully available for the bandwidth change. If the join point switching node 114 has only received and acknowledged the request to increase bandwidth for one of the redundant channels, it will use that channel as the selected "primary" redundant channel until it has received the message from the other redundant channel, in which case it again considers any of them as equivalent good sources of bitstream. Node 112 may acknowledge the request to increase bandwidth upstreams as soon as it has received an acknowledgement message from any one of either node 113 or node 116, but will then disqualify the redundant channel towards the other node (from which no acknowledgement message has yet been received) by inserting Alarm Indication Signal markings into the bitstream towards the node that has so far failed to acknowledge the request to increase bandwidth. Thus, if the expected request to increase bandwidth or the expected acknowledgement only appears for one of the redundant channels and does not appear within some specified time for the other redundant channel, that other redundant channel has failed to respond and node 112 or node 114 respectively requests that the redundant channel is removed.

In FIG. 6, to decrease the bandwidth of a protected channel established with node 111 as a sender, node 112 as a split point switching node, node 113 and node 116 as intermediary switching nodes, node 114 as join point switching node and node 115 as receiver, node 111 releases (REL) the slots to be deallocated on its bitstream 101a and, in doing so, starts transmitting idle markings in the released slots (while still transmitting payload data in the channel's other slots). Node 111 then sends a change request message (CH) in a control channel to node 112. Receiving this message, node 112 similarly releases the slots to be deallocated on bitstream 101a (for the second redundant channel going via node 116) and on bitstream 102a (for the first redundant channel going via node 113), starts transmitting idle markings in the released slots (while still mapping data from/to the channel's other slots), and sends a similar change request message in the control channels to node 113 and node 116. Receiving this message, node 113 similarly releases the slots to be deallocated on it bitstream 103a (for the portion of the first redundant channel from node 113 to node 114), starts transmitting idle markings therein (while still mapping data from/to the channel's other slots), and sends a similar change request message in the control channels to node 114. Node 116 similarly releases the slots to be deallocated from the second redundant channel on it bitstream 104a, starts transmitting idle markings therein (while still mapping data from/to the channel's other slots), and sends a similar change request message in the control channels to node 114. Receiving these messages from node 113 and node 116, node 114 similarly releases the slots to be deallocated from the downstream channel on it bitstream 103a from node 114 to node 115, starts transmitting idle markings therein (while still mapping data from/to the channel's other slots), and sends a similar change request message in the control channels to node 115. When the change of bandwidth request message from node 114 reaches the node 115, it stops listening to the slots to be deallocated (while continuing listening to the channel's other slots) and sends an acknowledge message (ACK) in a control channel to node 114. Having received the acknowledgement from node 115, node 114 fully deallocates the released slots from the channel on bitstream 103a from node 114 to node 115. It then sends an acknowledgement messages to node 113 and node 116. Having received the acknowledgement from node 114, node 113 performs fully deallocates the slots from the first redundant channel on bitstream 103a. It then sends an acknowledgement message to node 112. Having received the acknowledgement from node 114, node 116 fully deallocates the slots from the second redundant channel on bitstream 104a. It then sends an acknowledgement message to node 112. Having received the acknowledgements from both node 113 and node 116, node 112 fully deallocates the released slots of the second redundant channel on bitstream 101a to node 116 and of the second redundant channel on bitstream 102a. It then sends an acknowledgement message to node 111. Finally when the sending node 111 receives an acknowledging message from node 112, it fully deallocates the released slots of the channel on bitstream 101a form node 111 to 112.

According to one embodiment, the joint point node 114 must have received the request to decrease bandwidth messages for both the redundant channels which node 114 acts as a joint point for, i.e. for both the first redundant channel from node 113 and the second redundant channel from node 116, before it considers the request. In this embodiment, node 112 may issue the acknowledge message as soon as it has received the acknowledge message from either node 113 or node 116. An alternative embodiment, node 114 could consider the request as soon as it has received the request from either node 113 or node 116, but node 112 will await the acknowledgement from both node 113 and node 116 to ensure the full support of both channels.

According to an alternative embodiment, if the bandwidth change as such has higher priority than reducing the risk of a reduction in the level of redundancy node 112 in the previous example could issue the acknowledgement message upstream as soon as it has received the acknowledgement message from either node 113 or node 116. Under these conditions, one of the first redundant channel over node 113 or the second redundant channel over node 116 may not be fully available for the bandwidth change. If the join point switching node 114 has only received the request to decrease bandwidth for one of the redundant channels, then it will use that channel as the selected "primary" redundant channel until it has received the message from the other redundant channel, in which case it again considers any of them as equivalent good sources of bitstream. Node 112 may acknowledge the request to decrease bandwidth upstreams as soon as it has received an acknowledgement message from any one of either node 113 or node 116, but will then disqualify the redundant channel towards the other node (from which no acknowledgement message has yet been received) by inserting Alarm Indication Signal markings into the bitstream towards the node that has so far failed to acknowledge the request to increase bandwidth. Thus, if the expected request to decrease bandwidth or the expected acknowledgement only appears for one of the redundant channels and does not appear within some specified time for the other redundant channel, that channel has failed to respond and node 112 or node 114 respectively requests that the redundant channel is removed.

According to an embodiment, a method is provided for increasing the bandwidth of a circuit switched channel in a time division multiplexed network, said channel comprising a set of time slots within each recurring frame of a bitstream of said network, said method comprising the steps of: reserving, for said channel, one or more additional time slots within each recurring frame of said bitstream, including using, during a period of time, only said set of time slots for transmitting payload data pertaining to said channel while providing, during said period of time, information indicating that said one or more additional time slots are currently not used for transferring payload data; and using, after said period of time, said set of time slots as well as said one or more additional time slots on said bitstream for transmitting payload data pertaining to said channel.

According to the embodiment said reserving step may comprise a step of providing, to one or more nodes receiving or switching said channel from said bitstream, information requesting that the one or more additional time slots are to be part of said channel.

According to the embodiment, a further step may be provided, namely receiving information from one or more nodes receiving or switching said channel from said bitstream, or downstream thereof, indicating that these are ready to handle payload data pertaining to said channel with respect to the one or more additional time slots, thereby defining the end of said period of time.

According to the embodiment, a further step may be provided, namely receiving information from all nodes receiving or switching said channel from said bitstream, indicating that these are ready to handle payload data pertaining to said channel with respect to the one or more additional time slots, thereby defining the end of said period of time.

According to a further embodiment, a method is provided for increasing the bandwidth of a circuit switched channel in a time division multiplexed network, said channel being switched from a first set of time slots within each recurring frame of a first bitstream to a second set of time slots within each recurring frame of a second bitstream, said method comprising the steps of: receiving information requesting that one or more additional time slots within each recurring frame of the first bitstream are to be part of said channel; reserving for said channel, in addition to the second set of time slots, one or more additional time slot within each recurring frame of the second bitstream, including using, during a period of time, only the second set of time slots for transmitting payload data mapped from the first set of time slots while providing, during said period of time, information indicating that the one or more additional time slots on said second bitstream are currently not used for transferring payload data; and using, after said period of time, the second set of time slots as well as the one or more additional time slots on the second bitstream for transmitting payload data that is mapped from the first set of time slot as well as the one or more additional time slots on the first bitstream.

According the further embodiment the reserving step may comprise the step of providing, to one or more nodes receiving or switching said channel from the second bitstream, information requesting that said one or more additional time slots on said second bitstream are to be part of said channel.

According the further embodiment, a further step may be provided, namely receiving information from one or more nodes receiving or switching said channel from said second bitstream, or downstream thereof, indicating that they are ready to handle payload data pertaining to said channel with respect to the one or more additional time slots on the second bitstream, thereby defining the end of said period of time.

According the further embodiment, a further step may be provided, namely receiving information indicating that all nodes receiving or switching said channel from said bitstream, are ready to handle payload data pertaining to said channel with respect to said one or more additional time slots, thereby defining the end of said period of time.

According the further embodiment, a further step may be provided, namely providing, at the end of or after said period of time, information acknowledging that mapping of payload data from the first set of time slots as well as the one or more additional time slots on the first bitstream to the second bitstream has been established.

According the further embodiment, any reconfiguring of time slot mapping from the first bitstream to the second bitstream, with respect to the time slots forming said channel, necessary as a result of the change of the amount of time slots allocated to said channel may be carried out after the completion of any reconfiguring of time slot mapping performed at one or more nodes receiving or switching said channel from said second bitstream, or downstream thereof.

According the further embodiment, the reconfiguring of time slot mapping from the first bitstream to the second bitstream, with respect to the time slots forming said channel, may further be performed before said bandwidth change is acknowledged to an upstream node being the sender of or switching said channel.

According to another embodiment, a method is provided for decreasing the bandwidth of a circuit switched channel in a time division multiplexed network, said channel comprising a set of time slots within each recurring frame of a bitstream of said network, said method comprising the steps of: using, during a period of time, only a portion of said set of time slots for transmitting payload data pertaining to said channel while providing, during said period of time, information indicating that the remaining time slots of said set of time slots are currently not used for transferring payload data; and deallocating, after said period of time, said remaining time slots from said channel while continuing using said portion of said set of time slots for transmitting payload data pertaining to said channel.

According to said another embodiment, a further step may be provided, namely providing, at the start of said period of time, to one or more nodes receiving or switching said channel from said bitstream, information requesting that said remaining time slots are to be deallocated from said channel.

According to said another embodiment, a further step may be provided, namely receiving information, from one or more nodes receiving or switching said channel from said bitstream, indicating that they no longer consider said remaining time slots to be part of said channel, thereby defining the end of said period of time.

According to said another embodiment, a further step may be provided, namely receiving information indicating that all nodes receiving or switching said channel from said bitstream no longer consider said remaining time slots to be part of said channel, thereby defining the end of said period of time.

According to another embodiment, a method is provided for increasing the bandwidth of a circuit switched channel in a time division multiplexed network, said channel comprising a set of time slots within each recurring frame of a bitstream between a first and a second node of the network, said method comprising the steps of: said first node allocating to said channel, in addition to said set of time slots, one or more additional time slots within each frame of said bitstream; said first node providing, using a control channel on said bitstream, said second node with information requesting that said one or more additional time slot are to be part of said channel; said first node, while waiting for information confirming that said one or more additional time slots may be used for providing payload data, using only said set of time slots for transmitting payload data pertaining to said channel while providing said one or more additional time slots with information indicating that they are currently not used for transferring payload data; said second node, after having received said information requesting that said one or more additional time slot are to be part of said channel and having made any necessary arrangements for being able to handle payload data received in said one or more time slots, providing said first node, using a control channel established on a bitstream of the network, with confirmation information indicating that said second node is ready to start receiving payload data from said one or more additional time slots; and said first node, having received said confirmation information, using said first set of time slots as well as said one or more additional time slots on said bitstream for transmitting payload data pertaining to said channel.

According to yet another embodiment, a method is provided for changing the bandwidth of a circuit switched channel in a time division multiplexed network of the kind wherein data are transferred on bitstreams, each bitstream being divided into recurrent frames and each frame being divided into time slots, wherein an intermediate node provides mapping of time slots allocated to said channel on a first bitstream and time slots allocated to said channel on a second bitstream, said method comprising the step of: performing, at said intermediate node, any reconfiguring of time slot mapping with respect to the time slots forming said channel at said intermediate node, required as a result of the change of the amount or resources allocated to said channel, after the completion of any required reconfiguring of time slot mapping performed among the time slots forming said channel at a node handling said channel and being arranged downstream with respect to said intermediate node.

According to said yet another embodiment, the reconfiguring of time slot mapping at said intermediate node may further preformed before the bandwidth change is acknowledged to an upstream node being the sender of or switching said channel.

According to a further embodiment, a method is provided for increasing the bandwidth of an existing isochronous channel in a circuit switched time division multiplexed network of the kind wherein data are transferred on bitstreams, each bitstream being divided into recurrent frames and each frame being divided into time slots, said isochronous channel comprising a set of time slots within each frame of a bitstream between a first node and a second node, said method comprising the steps of: allocating to said channel, in addition to said set of time slots, one or more additional time slots within each frame of said bitstream; using, during a period of time, only a subset of the time slots of the enlarged set of time slots formed by said a set of time slots and said one or more additional time slots for transmitting payload data pertaining to said channel, the number of time slots in said subset of time slots not exceeding the number of time slots in said a set of time slots, and providing, during said period of time, said bitstream with information indicating that the remaining time slots of said enlarged set of time slots are currently not used for transferring payload data; and using, after said period of time, said a set of time slots as well as said one or more additional time slots on said bitstream for transmitting payload data pertaining to said channel.

According to said further embodiment the step of using, during a period of time, only a subset of the time slots may comprise: using, during said period of time, only said a set of time slots for transmitting payload data pertaining to said channel and providing, during said period of time, said bitstream with information indicating that said one or more additional time slots are currently not used for transferring payload data.

According to said further embodiment the end of said period of time may be related to the reception of information indicating that one or more nodes handling said channel are ready to receive payload data pertaining to said channel from said one or more additional time slots.

According to said further embodiment, said first node can manages the allocation of said one or more additional time slots to said channel on said bitstream and provides said second node with information requesting that said one or more additional time slots are to be part of said channel.

According to said further embodiment, said second node, having received said information requesting that said one or more additional time slots are to be part of said channel and having made any necessary arrangements for being able to handle payload data received in said one or more time slots, may provide said first node with confirmation information indicating that said second node is ready to start receiving payload data from said one or more additional time slots.

According to said further embodiment, said period of time may end after the reception of said confirmation information at said first node.

According to said further embodiment, said channel may further comprises another set of time slots on another bitstream between said second node and a third node, and said method may comprises the further steps of: allocating to said channel, in addition to said another set of time slots, one or more additional time slots within each frame of said another bitstream; and providing mapping between the time slots forming said channel on said a bitstream and the time slots forming said channel on said another bitstream, as well as, or thereby providing, mapping of said information designating the time slots that are currently not used for transferring payload data.

According to said further embodiment, said further steps may be performed at said second node.

According to said further embodiment, said second node, having allocated said one or more additional time slots, having established said mapping, and having made any other necessary arrangements for being able to handle payload data received in said one or more time slots, may provides said first node with said confirmation information indicating that said second node is ready to start transferring payload data from said one or more additional time slots allocated to said channel on said a bitstream.

According to said further embodiment, said feature of having made said arrangements for being able to handle payload data may comprise notifying and receiving acknowledgement from said third node that said one or more additional time slots allocated to said channel on said another bitstream are now to be part of said channel.

According to said further embodiment, said period of time may end after the reception of said confirmation information at said first node.

According to said further embodiment, said re-mapping to be performed with respect to the time slots forming the channel at said second node, as a result of the change of the amount of resources allocated to said channel, may be carried out after the completion of any re-mapping performed among the time slots forming the channel at a node handling said channel and being arranged downstream with respect to said second node.

According to yet a further embodiment a method is provided for increasing the bandwidth of a multicasted circuit switched channel in a time division multiplexed network, said channel comprising a set of time slots within each recurring frame of a bitstream of said network, said method comprising the steps of: reserving, for said channel, one or more additional time slots within each recurring frame of said bitstream, including using, up to a point in time at which it has been determined that all nodes receiving or switching said mulitcasted channel from, or downstream with respect to, said bitstream has made the necessary arrangements to received payload data with respect to the increased bandwidth presented by said additional time slots, only said set of time slots for transmitting payload data pertaining to said channel while providing information indicating that said one or more additional time slots are currently not used for transferring payload data; and using, after said point in time, said set of time slots as well as said one or more additional time slots on said bitstream for transmitting payload data pertaining to said channel.

According to the above embodiments, said information indicating that a time slot is not used for transferring payload data may be provided by the step of marking said time slot as being idle.

According to the above embodiments, said step of marking said time slot as being idle may comprise transmitting idle time slot identifying data, such as an identifiable code word, for said time slot.

According to the above embodiments, said network may be a Dynamic synchronous Transfer Mode (DTM) network.

The scope of the invention is not to be limited by the exemplifying embodiments thereof disclosed herein, while combinations and modifications thereof, as will be evident for those skilled in the art, may be performed within the scope of the invention, which is defined by the accompanying claims.

The invention claimed is:

1. A method for increasing the bandwidth of a protected circuit switched channel in a fiber based time division multiplexed network, wherein said network comprising a plurality of nodes that are interconnected via network links, each link comprising a respective bitstream that is divided into a recurring frame, said recurring frame being divided into time slots, each time slot comprising a number of bits, a protected channel is established to comprise a first circuit switched channel and a second circuit switched channel, said first circuit switched channel is established from a first node of said nodes to a second node of said nodes over a first network path comprising a first set of one or more links of said network interconnecting said first node to said second node via zero or more intermediate nodes, said second circuit switched channel is established from said first node to said second node over a second network path comprising a second set of one or more links of said network interconnecting said first node to said second node via zero or more intermediate nodes, said first circuit switched channel being defined by a respective first set of time slots within each respective recurring frame of each respective bitstream of said first set of links, said second circuit switched channel being defined by a second respective set of time slots within each respective recurring frame of each respective bitstream of said second set of links, payload data for said protected channel is copied into both the first circuit switched channel and the second circuit switched channel so that copies of the same payload data is transported in parallel over said first network path and said second network path, wherein increasing the bandwidth of said protected channel comprises the steps of:

reserving one or more additional time slots within each respective recurring frame of the respective bitstreams of said first set of links, continuing using said first respective set of time slots for transmitting said payload data, and providing information indicating that said one or more additional time slots are currently not used for transferring payload data; and reserving one or more additional time slots within each respective recurring frame of the respective bitstreams of said second set of links, continuing using said second respective set of time slots for transmitting said payload data, and providing information indicating that said one or more additional time slots are currently not used for transferring payload data; and establishing information indicating that the nodes of said network receiving or switching said first circuit switched channel and the nodes of said network receiving or switching said second circuit switched channel, and nodes downstream thereof receiving or switching said protected channel, are ready to handle payload data of said protected channel at a higher bandwidth using said additional time slots and, thereupon, discontinuing indicating that said one or more additional time slots are currently not used for transferring payload data and start using said first and second respective set of time slots as well as said additional time slots for transmitting said payload data of said protected channel.

2. A method as claimed in claim 1, wherein said reserving steps comprises providing, to one or more nodes receiving or switching said first circuit switched channel and said second switched channel, information requesting that the one or more additional time slots are to be part of said channel.

3. A method as claimed in claim 2, said establishing step comprising one or more nodes receiving or switching said first circuit switched channel and one or more nodes receiving or switching said second circuit switched channel, or nodes downstream thereof receiving or switching said protected channel, providing information to nodes upstreams indicating that the former nodes are ready to handle payload data of said protected channel with respect to the respective one or more additional time slots.

4. A method as claimed in claim 1, said establishing step comprising receiving information from all applicable nodes receiving or switching said protected channel, indicating that these are ready to handle payload data pertaining to said protected channel with respect to the one or more additional time slots.

5. A method as claimed in claim 1, wherein said step of providing information indicating that said one or more additional time slots are currently not used for transferring payload data comprises transmitting idle time slot identifying data, such as an identifiable code word, for said time slot.

6. A method as claimed in claim 1, said establishing step comprising the step of said second node providing information upstreams for each of said first network path and said second network path indicating that said second node is ready to handle payload data pertaining to said protected channel with respect to said one or more additional time slots, and said first node discontinuing indicating that said one or more additional time slots are currently not used for transferring payload data and start using said first and second respective set of time slots as well as said additional time slots for transmitting said payload data of said protected channel once the first node has received acknowledgements indicating that second node node is ready to handle payload data pertaining to said protected channel with respect to said one or more additional time slots for with respect to both said first circuit switched channel and said second circuit switched channel.

7. A method as claimed in claim 1, said establishing step comprising the step of said second node providing information upstreams, indicating that said second node is ready to handle payload data pertaining to said protected channel with respect to said one or more additional time slots, only when said second node is ready to handle payload data in the additional slots for both said first circuit switched channel and said second circuit switched channel.

* * * * *